US010765070B2

(12) United States Patent
Conrad et al.

(10) Patent No.: US 10,765,070 B2
(45) Date of Patent: Sep. 8, 2020

(54) SYSTEMS FOR CORRECTING SEED SOWING ERRORS AND RELATED METHODS

(71) Applicant: BALL HORTICULTURAL COMPANY, West Chicago, IL (US)

(72) Inventors: Robert Scott Conrad, Wheaton, IL (US); Xiaolei Hu, Aurora, IL (US)

(73) Assignee: BALL HORTICULTURAL COMPANY, West Chicago, IL (US)

( * ) Notice: Subject to any disclaimer, the term of this patent is extended or adjusted under 35 U.S.C. 154(b) by 448 days.

(21) Appl. No.: 15/844,418

(22) Filed: Dec. 15, 2017

(65) Prior Publication Data

US 2019/0183066 A1 Jun. 20, 2019

(51) Int. Cl.
*A01G 9/08* (2006.01)
*A01C 7/04* (2006.01)
*A01C 7/10* (2006.01)

(52) U.S. Cl.
CPC .............. *A01G 9/085* (2013.01); *A01C 7/044* (2013.01); *A01C 7/105* (2013.01)

(58) Field of Classification Search
CPC . A01G 9/085; A01G 9/08; A01G 9/00; A01C 7/044; A01C 7/042; A01C 7/04; A01C 7/00; A01C 7/105; A01C 7/102; A01C 7/10; A01C 7/08
See application file for complete search history.

(56) References Cited

U.S. PATENT DOCUMENTS 9,661,805 B1    5/2017  Conrad et al.
2010/0143906 A1  6/2010  Becker et al.

FOREIGN PATENT DOCUMENTS

AU         1649995 A    10/1995

OTHER PUBLICATIONS

Extended European Search Report in European Application No. 18166060.6, dated Oct. 1, 2018.

*Primary Examiner* — Christopher J. Novosad
(74) *Attorney, Agent, or Firm* — Marshall, Gerstein & Borun LLP; Randall G. Rueth

(57) ABSTRACT

A system for sowing seeds in cells of a germination tray or other container and related methods of operation. The system may include a conveyor configured to move the germination tray in a conveying direction, a seed storage container configured to hold a plurality of seeds, a seed sowing machine, and a seed diverting mechanism. The seed sowing machine may be configured to transfer the seeds from the seed storage container along at least one seed transport path and into respective cells of the germination tray as the conveyor moves the germination tray in the conveying direction. The seed diverting mechanism may be configured to selectively divert seeds from the at least one seed transport path such that the diverted seeds are not deposited in cells of the germination tray during operation.

22 Claims, 5 Drawing Sheets

SYSTEMS FOR CORRECTING SEED SOWING ERRORS AND RELATED METHODS

FIELD OF THE DISCLOSURE

The present disclosure is generally directed to seed sowing systems and, more particularly, to seed sowing systems capable of transferring seeds from a storage container to a germination tray.

BACKGROUND

Young plants are sometimes grown together in a germination tray. Germination trays typically include a plurality of cells or compartments arranged in evenly-spaced row and columns. Each cell may be filled with soil and then sowed with a single seed or grouping of seeds. The seedlings that sprout from these seeds may be transplanted into separate containers or the ground when they become too large for the germination tray.

Oftentimes a seed sowing machine is employed to assist with depositing seeds into respective cells of the germination tray. Conventional seed sowing machines typically are configured to pick up seeds from a hopper or other container of loose seeds. Thereafter, the seed sowing machine will carry the seeds in an orderly fashion to respective drop-off locations where the seeds are released and fall into respective cells of the germination tray. Throughout this process, the germination tray is continuously conveyed beneath the seed sowing machine, so that the seeds are dropped into cells of the germination tray in relatively rapid succession.

In certain situations, a conventional seed sowing machine may fail to deposit a seed or a target number of seeds in each cell of the germination tray. Such sowing errors can result from a variety of factors including, for example, the seed sowing machine failing to pick up seeds from the hopper, the seed sowing machine prematurely dropping seeds before transporting them to their intended drop-off locations, and/or the seeds bouncing or rolling off of the soil included in the germination tray upon impact. The faster the seed sowing machine operates the more likely that such sowing errors may occur. Thus, in order to ensure a high yield of seedlings from the germination tray, a conventional seed sowing machine may be operated at reduced speeds, where seed sowing errors are less likely to occur. Another challenge is that due to the size or color of certain seeds, it may be difficult or cost-prohibitive for a human to visually inspect the germination tray to confirm that a seed or a target number of seeds has been sown in each cell. Consequently, sowing errors may go unnoticed until seedlings begin to sprout from the germination tray, which in many cases is too late for taking corrective action.

The present disclosure sets forth seed sowing systems and seed sowing methods embodying advantageous alternatives to existing seed sowing systems and seed sowing methods, and that may address one or more of the challenges or needs mentioned herein, as well as provide other benefits and advantages.

SUMMARY

One aspect of the present disclosure provides a system for sowing seeds in cells of a germination tray. The system may include a conveyor configured to move the germination tray in a conveying direction, a seed storage container configured to hold a plurality of seeds, a seed sowing machine, and a seed diverting mechanism. The seed sowing machine may be configured to transfer the seeds from the seed storage container along at least one seed transport path and into respective cells of the germination tray as the conveyor moves the germination tray in the conveying direction. The seed diverting mechanism may be configured to selectively divert seeds from the at least one seed transport path such that the diverted seeds are not deposited in cells of the germination tray during operation.

Another aspect of the present disclosure provides a seed diverting mechanism configured for use with a seed sowing machine that transfers seeds along at least one seed transport path into respective cells of a germination tray. The seed diverting mechanism may include a seed deflector element and an actuator. The seed deflector element may be movable between a non-deflecting position where the seed deflector element is spaced apart from the at least one seed transport path, and a deflecting position where the seed deflector element obstructs the at least one seed transport path. The actuator may be configured to move the seed deflector element between the non-deflecting position and the deflecting position.

An additional aspect of the present disclosure provides a seed sowing method. The method may include: (a) identifying cells of a germination tray including a seed or a target number of seeds based on signals received from a detector; (b) receiving, with a seed sowing machine, seeds or groupings of seeds from a seed storage container at respective receiving locations; (c) carrying, with the seed sowing machine, the seeds or groupings of seeds to respective release locations arranged above the germination tray; (d) releasing the seeds or groupings of seeds from the seed sowing machine at the respective release locations such that each of the seeds or groupings of seeds falls along a respective seed transport path and into a target cell of the germination tray; and (e) diverting at least one of the seeds or groupings of seeds to prevent the seed sowing machine from depositing the at least one of the seeds or groupings of seeds into a cell of the germination tray previously identified to include a seed or a target number of seeds.

BRIEF DESCRIPTION OF THE DRAWINGS

It is believed that the disclosure will be more fully understood from the following description taken in conjunction with the accompanying drawings. Some of the drawings may have been simplified by the omission of selected elements for the purpose of more clearly showing other elements. Such omissions of elements in some drawings are not necessarily indicative of the presence or absence of particular elements in any of the exemplary embodiments, except as may be explicitly delineated in the corresponding written description. Also, none of the drawings is necessarily to scale.

DETAILED DESCRIPTION

The present disclosure is generally directed to systems and methods for detecting and correcting seed sowing errors, without duplicating the successful sowing efforts of a primary or upstream seed sowing machine or process. In certain embodiments, the disclosed system may include a secondary or downstream seed sowing machine outfitted with a seed diverting mechanism. The seed diverting mechanism may be configured to selectively divert seeds which the secondary or downstream seed sowing machine would otherwise deposit in cells of a germination tray. Accordingly, the secondary or downstream seed sowing machine can be prevented from re-seeding cells of the germination tray which have already been sowed with a seed or a target number of seeds by the primary or upstream seed sowing machine, while also being allowed to seed the cells of the germination tray for which a seed or a target number of seeds is missing.

The ability to fix seed sowing errors can result in higher yields of seedlings from a germination tray or other container and/or may permit operating the primary or upstream seed sowing machine or process at higher speeds. Furthermore, the presently disclosed seed diverting mechanism may be compatible with existing seed sowing machines, such that a planter or owner is not required to purchase or obtain a new seed sowing machine in order to incorporate the presently disclosed seed diverting functionality. Additionally, in certain embodiments, the systems according to the present disclosure may include a detector configured to automatically detect the presence or absence of a seed or a target number of seeds within each cell of a germination tray. This detector may transmit information to a control unit, which in may control the seed diverting mechanism to divert seeds that would otherwise result in the re-seeding of properly seeded cells. So configured, the presently disclosed systems and methods may automatically correct seed sowing errors and require minimal or no action on behalf of a human operator.

Each of the foregoing components of the seed sowing system and methods of operating such a seed sowing system will now be described in more detail.

Figure 1:
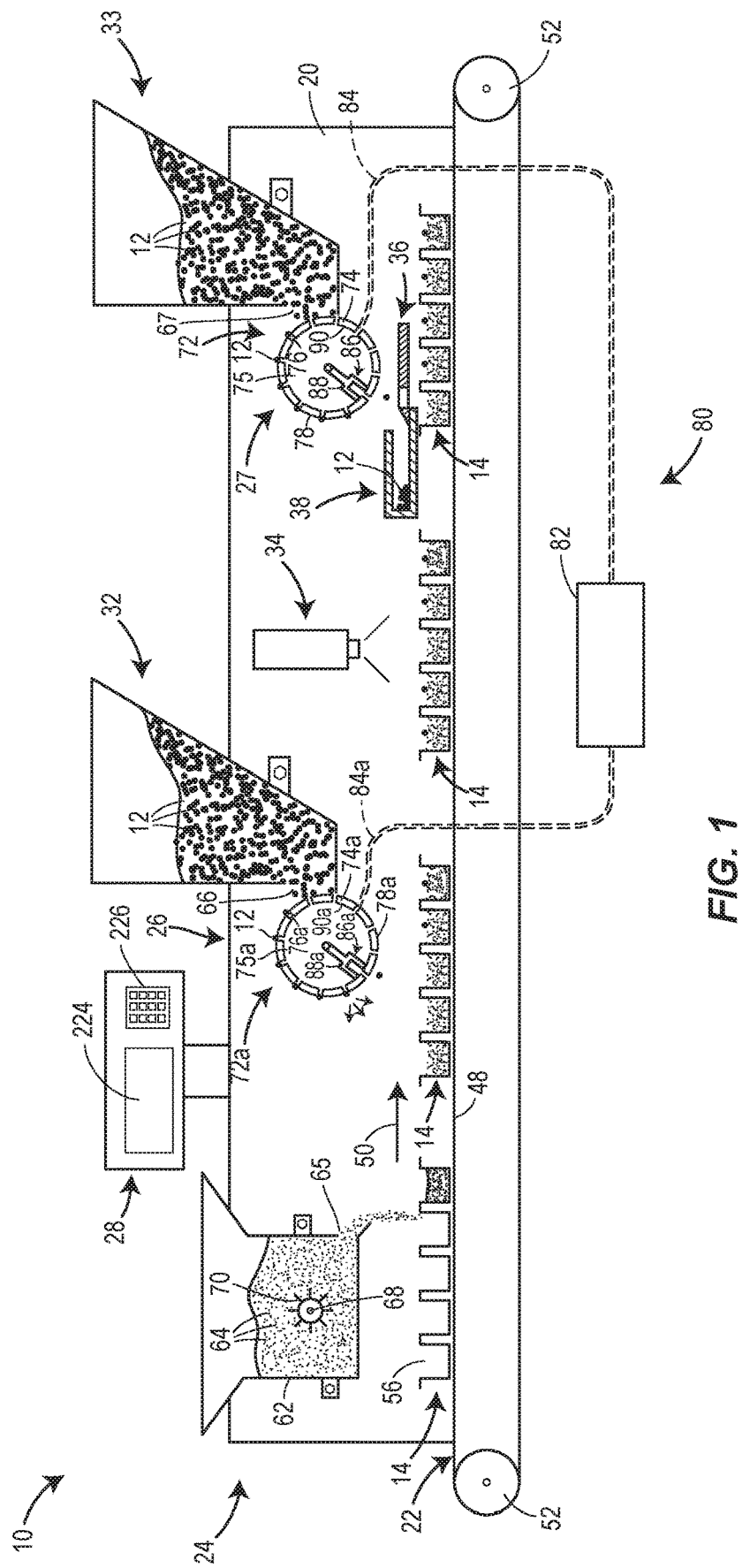
FIG. 1 illustrates a schematic cross-sectional view of an embodiment of a seed sowing system constructed in accordance with principles of the present disclosure.

FIG. 1 depicts a schematic representation of an embodiment of a seed sowing system 10 for sowing seeds 12 in a germination tray 14. Generally, the seed sowing system 10 may include a frame 20, a conveyor 22, a soil dispensing station 24, an upstream or primary seed sowing machine 26, a downstream or secondary seed sowing machine 27, a control unit 28, an upstream or primary seed storage container 32, a secondary or downstream seed storage container 33, a detector 34, a seed diverting mechanism 36, and a diverted seed receptacle 38. The frame 20 may be constructed of a single support structure or a plurality interconnected support structures, and may hold the soil dispensing station 24, the upstream seed sowing machine 26, the upstream sowing machine 26, the downstream seed sowing machine 27, the upstream seed storage container 32, the downstream seed storage container 37, the detector 34, and/or the seed diverting mechanism 36 above the conveyor 22. Additional upstream and/or downstream stations, machines, units, etc. may be added to the seed sowing system 10 such as, for example, a watering station, a tray stacking station, among others. Furthermore, various components of the seed sowing system 10 may be modular such that they can be arranged in various combinations and/or set up to accommodate various floor arrangements. Also, in some embodiments, the seed sowing system 10 may be sized and dimensioned to fit on a table or bench or other relatively small support structure.

The conveyor 22 may include a continuous belt 48 configured to move the germination tray 14, or multiple such trays, in a conveying direction 50 relative to the soil dispensing station 24, the upstream seed sowing machine 26, the downstream seed sowing machine 27, the detector 34, among other components of the seeding sowing system 10. The continuous belt 48 may be wrapped around a plurality of rollers 52, at least one of which may be rotated by an electric motor, which in turn may be controlled by the control unit 28. In some embodiments, the rollers 52 may be rotatably connected to the frame 20.

Figure 2:
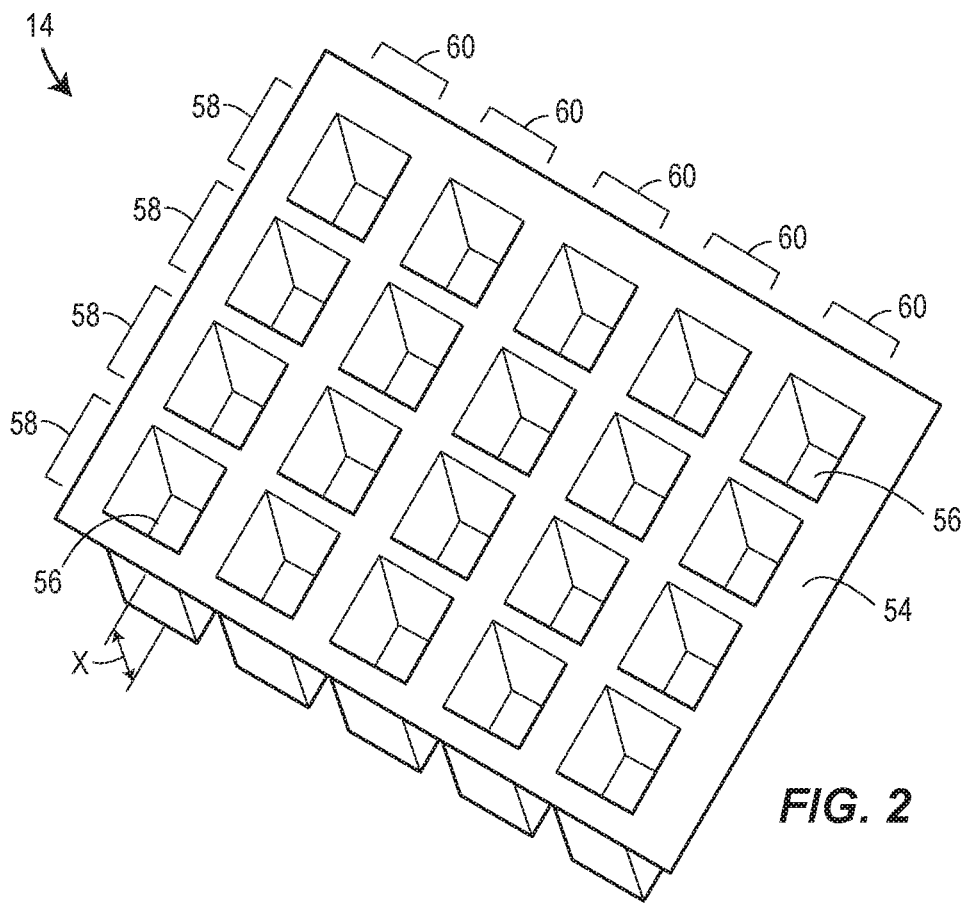
FIG. 2 is a top perspective view of an embodiment of a germination tray constructed in accordance with principles of the present disclosure.

Turning briefly to FIG. 2, the germination tray 14 may include a planar upper surface 54 and a plurality of cells 56 (e.g., depressions, compartments, cavities, etc.). Each cell 56 may be accessible through an opening formed in the upper surface 54 of the germination tray 14. Furthermore, each cell 56 may be separated from adjacent cells 56 by one or more internal walls of the germination tray 14. The cells 56 may be arranged in a plurality of evenly-spaced rows 58 and columns 60. When placed on the conveyor 22, the rows 58 of the germination tray 14 may be arranged such that they are parallel, substantially parallel, or otherwise non-perpendicular to the conveying direction 50 of the conveyor 22. In some embodiments, the cells 56 may be squared-shaped when viewed from above, and have sides measuring approximately (e.g., ±10%) two inches across, and a depth X of approximately (e.g., ±10%) three inches. Also, in some embodiments, the germination tray 14 may be made of a lightweight, semi-rigid material such as plastic.

Referring back to FIG. 1, the soil dispensing station 24 may include a soil storage container 62 fixedly connected to the frame 20 and filled with soil 64. In some embodiments, the soil 64 may include a mixture of peat, vermiculite, and/or perlite. The soil storage container 62 may be configured as a hopper or any other container capable of actively or passively discharging its contents. Furthermore, the soil storage container 62 may have an exit port 65 at its bottom through which a quantity of the soil 64 can be dispensed. Additionally, the soil storage container 62 may house a rotatable drum 68 having a plurality of radial agitators 70 (e.g., fins, grooves, etc.) configured to move the soil 64 toward the exit port 65 at a controlled rate. The rotational speed of the rotatable drum 68 may be set by an operator via the control unit 28. As shown in FIG. 1, the soil storage container 62 may be mounted above the conveyor 22 such that the soil 64 dispensed from the exit port 65 falls into the cells 56 of the germination tray 14 as the germination tray 14 moves in the conveying direction 50.

With continued reference to FIG. 1, the upstream and downstream seed storage containers 32 and 33 each may be fixedly connected to the frame 20 and each may be filled with a large quantity of the seeds 12. The seeds 12 may be loosely arranged or otherwise free to move relative to each other within each of the upstream and downstream seed storage containers 32 and 33. A discharge port 66 may be formed in the bottom of the upstream seed storage container 32 for supplying seeds 12 to the upstream seed sowing machine 26; and a discharge port 67 may be formed in the bottom of the downstream seed storage container 33 for supplying seeds 12 to the downstream seed sowing machine 27. In alternative embodiments, one of the upstream seed storage container 32 or the downstream seed storage container 33 may be omitted, and remaining one of the upstream and downstream seed storage containers 32 and 33 may supply seeds 12 to both of the upstream and downstream seed sowing machines 26 and 27. In some embodiments, one or both of the upstream and downstream seed storage containers 32 and 33 may be configured as a hopper with an interior surface tapering downwardly toward the discharge port 66 or 67. As an alternative or in addition thereto, one or both of the upstream and downstream seed storage containers 32 and 33 may include an agitating element housing within its interior for directing the seeds 12 towards the discharge port 66 or 67.

Figure 3:
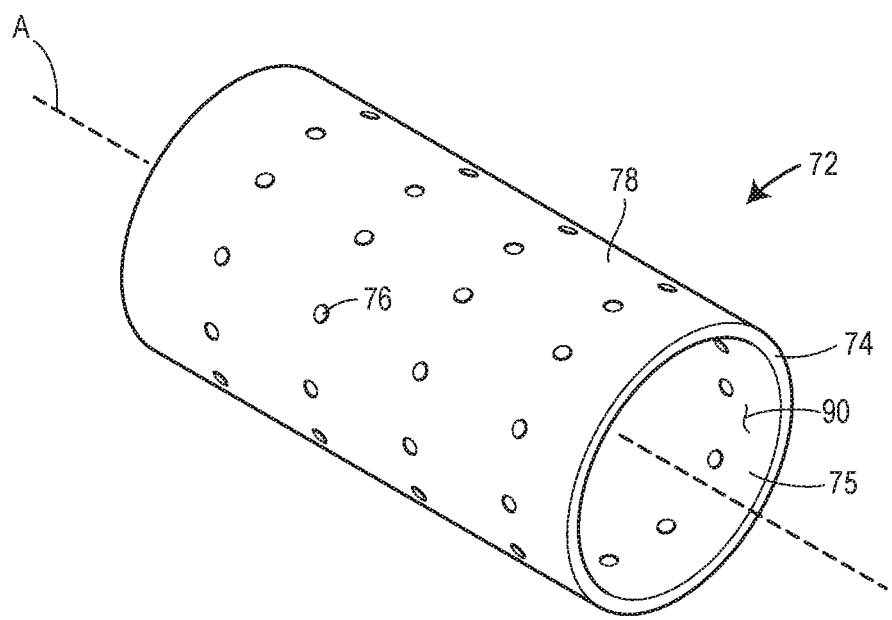
FIG. 3 is a side perspective view of an embodiment of a rotatable drum of a seed sowing machine constructed in accordance with principles of the present disclosure.
Figure 4:
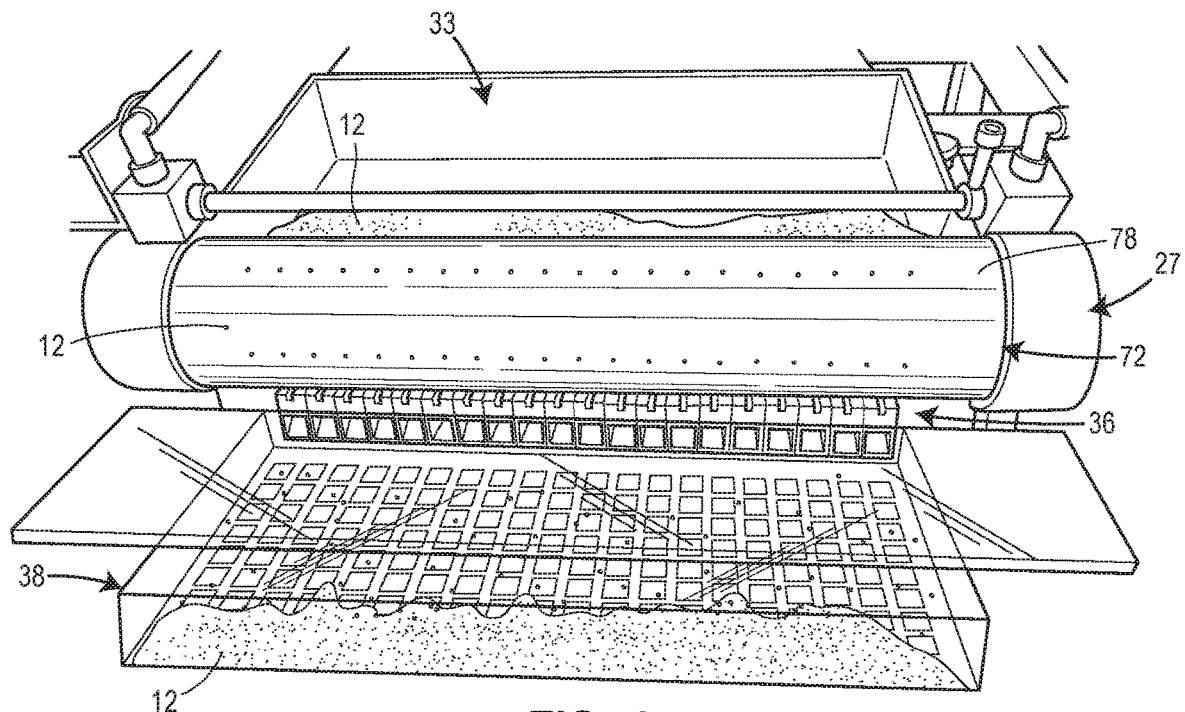
FIG. 4 is a front perspective view of an embodiment of a seed sowing machine outfitted with a seed diverting mechanism in accordance with principles of the present disclosure.

Still referring to FIG. 1, the downstream seed sowing machine 27 may include a rotatable drum 72 rotatably connected to the frame 20 and disposed immediately adjacent to the discharge port 67 of the downstream seed storage container 33. As seen in FIG. 3, the rotatable drum 72 may be configured to rotate about a rotational axis A, which may pass centrally through the drum 72 and may correspond to a longitudinal axis of the rotatable drum 72. The rotatable drum 72 may be rotated by an electric motor (not illustrated) whose speed is controllable by the control unit 28. In the embodiment shown in FIG. 1, the rotatable drum 72 is configured to rotate in the counter-clockwise direction during operation.

Furthermore, the rotatable drum 72 may include a cylindrical wall 74 having an outer surface 78 and which surrounds a hollow interior 75 of the rotatable drum 72. As shown in FIG. 1, the outer surface 78 of the rotatable drum 72 may positioned to receive seeds 12 discharged from the downstream seed storage container 33. Furthermore, a plurality of openings 76 (e.g., through holes) may be formed in the outer surface 78 and extend through the cylindrical peripheral wall 74 such that they communicate with the hollow interior 75 of the rotatable drum 72. The openings 76 may be arranged in a plurality of rows which are evenly spaced in a circumferential direction around the outer surface 78 of the rotatable drum 72. Each of the rows of openings 76 may extend in a direction that is parallel, substantially parallel, or otherwise non-perpendicular to the rotational axis A of the rotatable drum 72. Furthermore, each of the openings 76 may have a circular cross-section and a diameter which is smaller than that of a largest dimension of each of the seeds 12. This may prevent the seeds 12 from being sucked through the openings 76. In some embodiments, a hemispherical dimple (not illustrated) may be formed in the outer surface 78 of the cylindrical wall 74 at the location of each of the apertures 76, which can provide a seat for holding one or more of the seeds 12. As described in more detail below, each of the openings 76 is intended to provide suction which temporarily holds a single seed 12 or a single grouping of seeds 12 against the outer surface 78 of the cylindrical wall 74, so that each row of openings 76 defines a row of spaced apart seeds 12 of groupings of seeds 12.

The downstream seed dispensing machine 26 may include a seed suction element 80 including a vacuum pump 82 in gaseous communication with the hollow interior 75 of the rotatable drum 72 via a hose 84 or other conduit. In some embodiments, the vacuum pump 82 may be controllable via the control unit 28 so that an operator can optimize the pressure level within the hollow interior 75 depending on the size, weight, and/or other characteristics of the seeds 12. The vacuum pump 82 may be configured to reduce air pressure within the hollow interior 75 so that it is lower than atmospheric pressure. As a result, a suctioning or pulling force may be created at the mouth of each of the openings 76. This suctioning force may cause each row of openings 76 to pick up individual seeds 12 or groupings of seeds 12 at respective spaced apart receiving locations as the row is rotated past the discharge port 67 of the downstream seed storage container 33. Each of the receiving locations may correspond to a respective one of the openings 76 included in a row of openings 76 when the respective one of the openings 76 is arranged at a certain rotational position relative to the rotational axis A. Because the seeds 12 may be larger than the openings 76, the seeds 12 may be held by the suction force against, or otherwise carried by, the outer surface 78 of the rotatable drum 72 as the rotatable drum 72 rotates about the rotational axis A. Furthermore, a plurality of spaced apart seeds 12 or groupings of seeds 12 may be held against the outer surface 78 of the rotatable drum 72 in a plurality of parallel rows corresponding to the rows of openings 76 as the rotatable drum 72 rotates about the rotational axis A. Each row of spaced apart seeds 12 or groupings of seeds 12 may be carried by the rotatable drum 72 along a pre-defined arc until each of the spaced apart seeds 12 or groupings of seeds 12 within a row reaches a respective release location near the bottom of the rotatable drum 72. Here, each of the spaced apart seeds 12 or groupings of seeds 12 included in a row may be released, simultaneously or substantially simultaneously, so that each falls under gravity in a vertical or substantially vertical direction into a respective cell 56 of the germination tray 14. Each row of spaced apart seeds 12 or groupings of seeds 12 may be dropped, one row at a time, as the rotatable drum 72 rotates the spaced apart seeds 12 or groupings of seeds 12 through respective release locations.

To release a row of spaced apart seeds 12 or groupings of seeds 12 from the rotatable drum 72, the seed dispensing station 26 may include a seed release element 86. In some embodiments, such as the one illustrated in FIG. 1, the seed release element 86 may be disposed within the hollow interior 75 and include a pressure shoe 88 that slidably engages an inner surface 90 of the cylindrical wall 74. The pressure shoe 88 may be configured to create a pressure differential within the hollow interior 75 such that a positive pressure exists at the inner side of each opening 76 of a single row of the openings 76 currently located at the bottom half of the rotatable drum 72. Accordingly, this row of openings 76 may release its row of spaced apart seeds 12 or groupings of seeds 12 such that they are dropped into respective cells 56 of the germination tray 14. The positive pressure created by the pressure shoe 88 may be greater than the vacuum pressure created by the seed suction element 80 within a remainder of the hollow interior 75 of the rotatable drum 72. In some embodiments, the pressure shoe 88 may which is create a pressure at the inner side of a row of openings 76 that is equal to or greater than atmospheric pressure in order to release the row of spaced apart seeds 12 or groupings of seeds 12.

So configured, the downstream seed sowing machine 27, during operation, may transfer each of the spaced apart seeds 12 or groupings of seeds 12 received from the downstream seed storage container 33 along a respective seed transport path 94 and into a respective cell 56 of the germination tray 14 as the germination tray 14 is conveyed in the conveying direction 50 by the conveyor 22 relative to the downstream seed sowing machine 27. Each seed transport path 94 may be fixed or stationary relative the conveyor 22 and the rotatable drum 72 while a seed 12 or grouping of seeds 12 is transferred along the seed transport path 94 by the downstream seed sowing machine 27. Furthermore, each seed transport path 94 may include at least a first portion 96 and a second portion 98. The first portion 96 of the seed transport path 94 may correspond to the path of a seed 12 or grouping of seeds 12 when said seed 12 or grouping of seeds 12 is suctioned to or otherwise carried by the seed sowing machine 27. Accordingly, the first portion 96 of the seed transport path 94 may start at one of the above-described receiving locations and terminate at one of the above-described release locations. The second portion 98 of the seed transport path 94 may correspond to the path of said seed 12 or grouping of seeds 12 after said seed 12 or grouping of seeds 12 is dropped or otherwise released by the seed sowing machine 27. Accordingly, the second portion 98 of the seed transport path 94 may correspond to a drop path of said seed 12 or grouping of seeds 12. As used herein, a seed transport path 94 refers to the path of an individual seed 12 or an individual grouping of seeds 12. Thus, when a row of spaced apart seeds 12 or groupings of seeds 12 is carried by the rotatable drum 12, each of the seeds 12 or groupings of seeds 12 within that row may travel along a different respective seed transport path.

In the embodiment illustrated in FIG. 1, the upstream seed sowing machine 26 is configured and operates in the same manner as the downstream seed sowing machine 27, except that the upstream seeding sowing machine 26 is not outfitted with a seed diverting mechanism and does not receive seeds 12 from the downstream seed storage container 33. Elements of the upstream seed sowing machine 26 which are the same as or similar to elements of the downstream seed sowing machine 27 are designated by the same reference numeral, appended with the suffix "a". A description of these elements of the upstream seed sowing machine 26 is omitted in the interest of brevity. In alternative embodiments, the upstream seed sowing machine 26 and the downstream seed sowing machine 27 may have different configurations.

Furthermore, while each of the upstream and downstream seed sowing machines 26 and 27 of the present embodiment is disclosed as including a rotatable drum for transferring the seeds into respective cells 56 of the germination tray 14, the scope of the present disclosure is not limited to this configuration. Rather, alternative embodiments of the upstream seed sowing machine 26 and/or the downstream seed sowing machine 27 may be drum-less, and instead may include multiple stationary conduits each receiving seeds 12 from one of the seed storage containers 32 or 33 and each defining a channel or passageway having an inner dimension that tapers towards a discharge outlet such that individual seeds 12 or individual groupings of seeds 12 can be discharged from the discharge outlet one at a time into respective cells 56 of the germination tray 14. Other configurations of the seed sowing machines are also possible.

Still referring to FIG. 1, the detector 34 may be positioned between the upstream and downstream seed sowing machines 26 and 27, such that the detector 34 is located upstream of the downstream seed sowing machine 27 in the conveying direction 50. The detector 34 may be aimed downwardly such that the cells 56 of the germination tray 14 pass through a field of view of the detector 34 as the germination tray 14 is conveyed in the conveying direction 50 by the conveyor 22. Generally, the detector 34 may be configured to output seed signals (e.g., electric signals) indicative of the presence or absence of a seed 12 or a target number of seeds 12 in each cell 56 of the germination tray 14. In some embodiments, the detector 34 may be configured as an optical detector such as a digital camera or a line scan camera. Such an optical detector may incorporate a charge-coupled device (CCD), a complementary metal-oxide-semiconductor (CMOS), a photodiode, a photoresistor, a photovoltaic cell, or any other suitable photodetector capable converting light and/or other forms of electromagnetic energy reflected and/or emitted by the seeds 12 into electric signals. Alternative configurations of the detector 34 are also possible, including the ability to detect one or more of a heat signature, an infrared signature, radioactivity, a pH level, electrical conductivity, a magnetic field, a sonic or ultrasonic signature, a chemical or biochemical signature, a morphological attribute, and/or another characteristic of each of the seeds 12. Furthermore, in some embodiments, multiple detectors 34 may be included, each being configured to detect similar or different characteristics of the seeds 12.

The seed signals output by the detector 34 may be transmitted to the control unit 28 for processing, as described below. The detector 34 may be configured to transmit the seed signals to the control unit 28 via a wired and/or wireless connection. In some embodiments, the signals output by the detector 34 may be processed by the control unit 28 using object recognition techniques in order to identify and/or generate a map of the dimensions of the germination tray 14 including, for example, the locations of the cells 56 and/or seeds 12.

In some embodiments, the seeds 12 may be coated, infused, and/or surrounded (e.g., placed on the soil around the seed 12) with a marker that makes the seeds 12 stand out or otherwise helps distinguish them from the soil 64 contained in the cells 56 of the germination tray 14 to facilitate detection of the seeds 12 by the detector 34. In some embodiments, the marker may improve the reflective properties of the seeds 12, thereby increasing the signal to noise ratio when the seeds 12 are present in the detection path of the detector 34. Such coatings include, but are not limited to, fluorescent dyes capable of excitation and ground plant tissues including chlorophyll capable of excitation. Other suitable marking materials for coating, infusing, and/or surrounding the seeds 12 include, but are not limited to, non-fluorescent colored dyes, biochemical dyes, magnetic materials (e.g., iron), and isotopic materials (e.g., radioactive isotopes). Any combination of the foregoing marking markings is envisioned.

In some embodiments, the marker may be activated by adding a certain activating material to the seed 12 and/or the soil 64 around the seed 12. For example, the marker may be made of a water-activatable material, such that watering the seed 12 and/or the soil 64 around the seed 12 causes the marker to emit a detectable signal such as, for example, a visible signature, an infrared signature, and/or a heat signature. In some embodiments, the marker may be added to the seed 12 and configured to emit a biochemical signal in response to contact with materials (e.g., the soil 64) in the cell 64 or other materials located where the seed 12 is sowed. The biochemical signal may be due to a reaction based on the pH of the surrounding environment, or a reaction in response to the start of another biochemical reaction such as the consumption of oxygen by the seed 12.

As an alternative to or in addition to the detector 34, one or more detectors may be attached to the germination tray 14 at strategic locations (e.g., at the corners and/or center of the germination tray 14) for detecting the presence or absence of a seed 12 or a group of seeds 12 within each cell 54 of the germination tray 14.

Furthermore, in some embodiments a directional light source, such as a laser emitting a single wavelength of light or a narrow range of wavelengths of light, may be included to illuminate the seeds 12. This may increase the detection capabilities of the detector 34, particularly in embodiments where the detector 34 is configured as an optical detector. In some embodiments, such a directional light source may be configured and operate in conjunction with the detector 34 in a manner similar to that described in U.S. Pat. No. 9,661,805, which is hereby incorporated by reference in its entirety for all purposes.

With continued reference to FIG. 1, and now additionally FIGS. 4-7, the seed diverting mechanism 26 will be described. In general, the seed diverting mechanism 26 may be configured to selectively divert seeds 12 from one or more of the seed transport paths 94 defined by the downstream seed sowing machine 27, such that the diverted seeds 12 are not deposited in cells 54 of the germination tray 14 previously determined to have been properly sowed with a seed 12 or a target number of seeds 12. In some embodiments, the seed diverting mechanism 26 may comprise a plurality of independently controllable seed deflector elements 100a-t positioned vertically between the downstream seed sowing machine 27 and the conveyor 22 with enough clearance for the germination trays 14 to be conveyed by the conveyor 22 below the seed deflector elements 100a-t. The seed diverting mechanism 26 may include a plurality of actuators 102a-t configured to move, respectively, each of the seed deflector elements 100a-t between a deflecting position and a non-deflecting position. Furthermore, a plurality of housings 104a-t may be included for housing, respectively, each of the seed deflector elements 100a-t, when each seed deflector element is arranged in its deflecting position. Each of the units which is defined by a respective one of the seed deflector elements 100a-t, a respective one of the actuators 102a-t, and a respective one of the housings 104a-t may be identical to each other. Therefore, for the sake of brevity, only the unit defined by the seed deflector element 100a, the actuator 102a, and the housing 104a is described in detail below. The description of the seed deflector element 100a, the actuator 102a, and the housing 104a may be applicable to, respectively, each of the other seed deflector elements 100b-t, the actuators 102b-t, and housings 104b-t.

Figure 5:
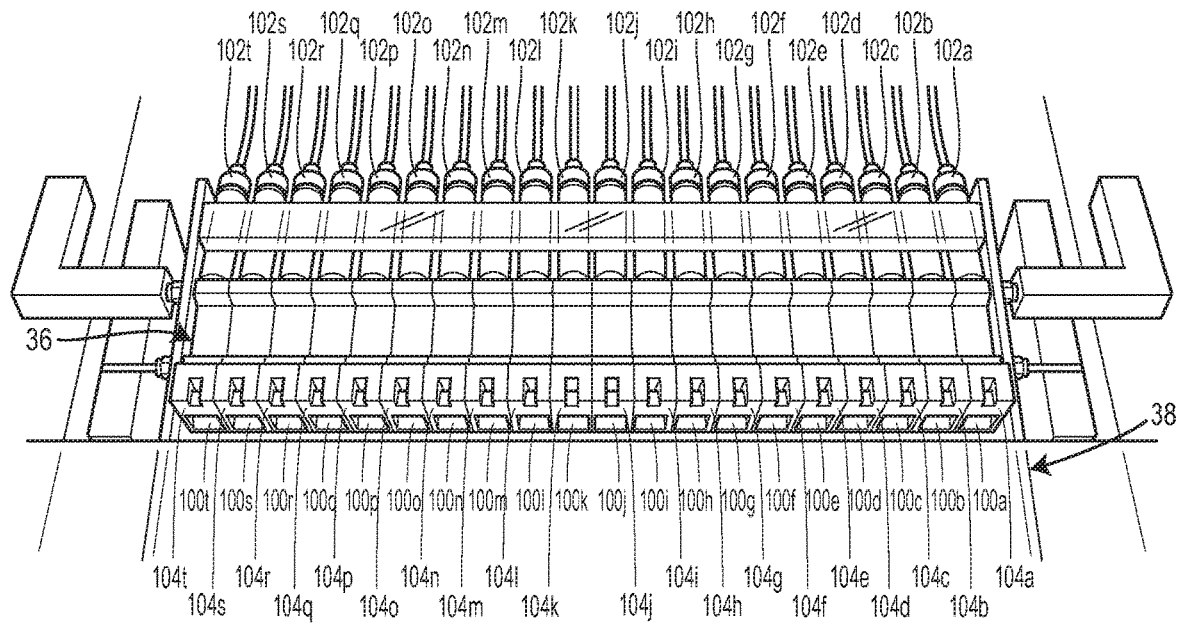
FIG. 5 is a similar view as FIG. 4, with the seed sowing machine omitted to reveal the seed diverting mechanism.
Figure 6:
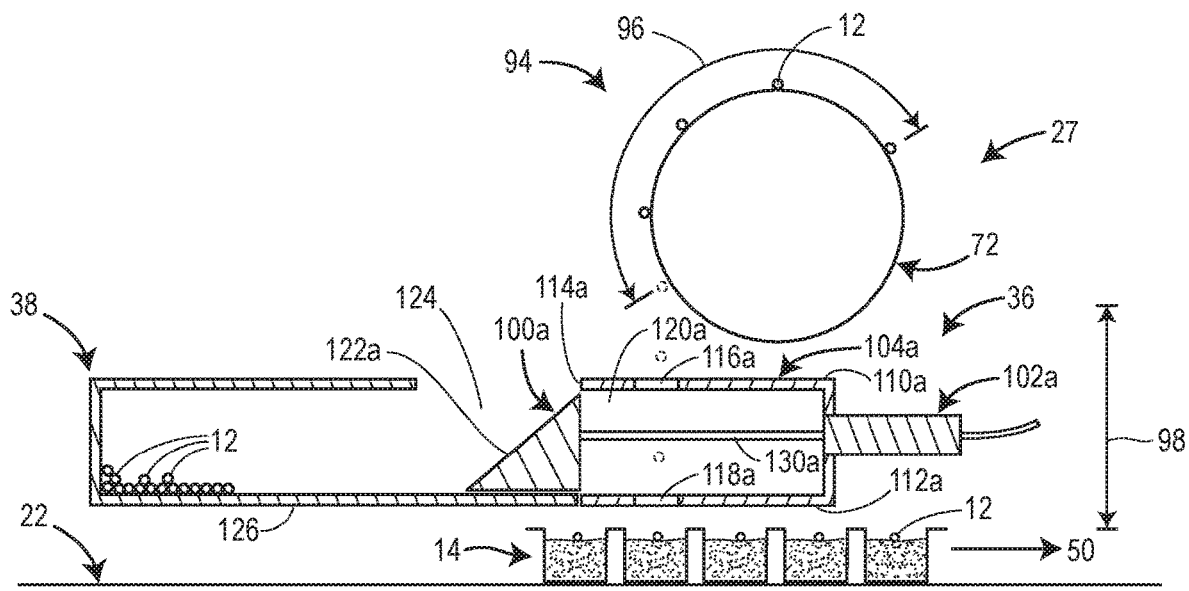
FIG. 6 is a schematic cross-sectional side view of an embodiment of a seed diverting mechanism having its seed deflector element arranged in a non-deflecting position.
Figure 7:
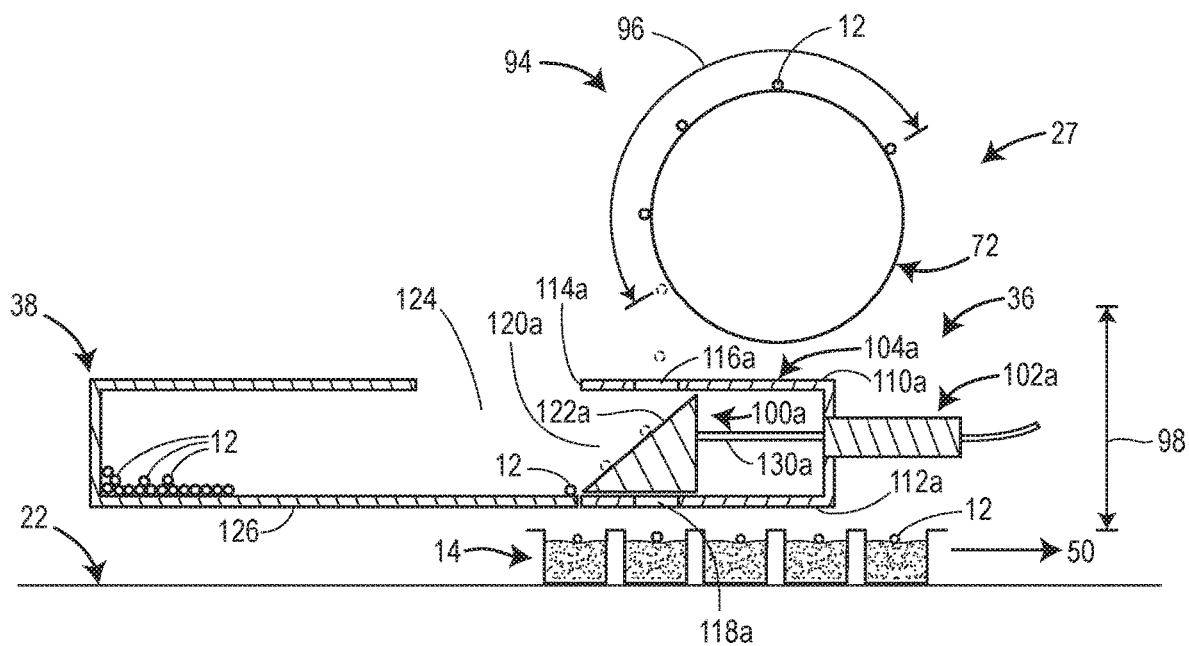
FIG. 7 is a schematic cross-sectional side view of the seed diverting mechanism of FIG. 6, with the seed deflector element arranged in a deflecting position.

Referring to FIGS. 5-7, the housing 104a may possess a hollow interior and generally take the shape of a rectangular box or other elongate shape having its longest dimension arranged parallel to the conveying direction 50. A top surface 110a of the housing 104a may face upwardly in the vertical direction, and a bottom surface 112a of the housing 104a may face downwardly in the vertical direction. A front surface 114a of the housing 104a may face laterally in a horizontal direction opposite to the conveying direction 50. Openings 116a, 118a, and 120a may be formed in respectively, the top surface 110a, the bottom surface 112a, and the front surface 114a of the housing 104, and each of the openings 116a, 118a, and 120a may communicate with the hollow interior of the housing 104. The openings 116a and 118a may be aligned with each other such that an imaginary vertical axis can pass centrally through each of the openings 116a and 118a. Furthermore, the housing 104a may be stationary positioned relative to the downstream seed sowing machine 27 such that the second portion 98 of the seed transport path 94 passes through each of the openings 116a and 118a. Still further, the openings 116a and 118a may have an inner diameter or other inner dimension that is larger than the largest dimension of any one of the seeds 12, such that each of the seeds 12 can pass or fall through the openings 116a and 118a when traveling along the second portion 98 of the seed transport path 94.

The seed deflector element 100a may be movable, via the actuator 102a, between the non-deflecting position where the seed deflector element 100a is spaced apart by a distance from the second portion 98 of the seed transport path 94, and the deflecting position where the seed deflector element 100a intersects or otherwise obstructs the second portion 98 of the seed transport path 94. When arranged in the non-deflecting position (see FIG. 6), the seed deflector element 100a may allow a seed 12 or grouping of seeds 12 dropped from the rotatable drum 72 to fall along the second portion 98 of the seed transport path 94 and into a target or intended cell 54 of the germination tray 14. In the illustrated embodiment, the seed deflector element 100a extends outwardly through the opening 120a in the front surface 114a of the housing 104a when arranged in the non-deflecting position. When arranged in the deflecting position (see FIG. 7), the seed deflector element 100a may deflect or otherwise divert a seed 12 or grouping of seeds 12 traveling along the second portion 98 of the seed transport path 94 into the diverted seed receptacle 38. Accordingly, the seed deflector element 100a may be used to selectively divert seeds 12 into the diverted seed receptacle 38 that would otherwise fall into the germination tray 14. In some embodiments, such as the one shown in FIG. 7, the seed deflector element 100a may be retracted at least partially within the opening 120a in the front surface 114a of the housing 104a when arranged in the non-deflecting position, such that at least a portion of the seed deflector element 100a is arranged within the hollow interior of the housing 104 when arranged in the non-deflecting position.

In some embodiments, the seed deflector element 100a may include an inclined surface 122a that may function as a ramp for directing seeds 12 into the diverted seed receptacle 38 when the seed deflector element 100a is arranged in the deflecting position. The inclined surface 122a may be a planar surface as shown in FIGS. 6 and 7. Alternatively, the inclined surface 122a may be a curved surface, or a surface having a combination of planar and curved sections. When the seed deflector element 100a occupies the deflecting position, the inclined surface 122a may intersect the second portion 98 of the seed transport path 94 at a non-perpendicular angle (i.e., an angle that is less than 90 degrees). In some embodiments, the seed deflector element 100a may intersect the second portion 98 of the seed transport path 94, which may be parallel to the vertical direction or the direction of gravity, at an angle between approximately (e.g., ±10%) 15-75 degrees, or at an angle between approximately (e.g., ±10%) 30-60 degrees, or at an angle less than approximately (e.g., ±10%) 75 degrees, or at angle of approximately (e.g., ±10%) 45 degrees.

Referring to FIG. 7, a rear end of the diverted seed receptacle 38 may include an inlet 124 positioned to receive the diverted seeds 12 directly from the inclined surface 122 of the seed deflector element 100a. In some embodiments, this may be accomplished by arranging a bottom wall 126 of the diverted seed receptacle 38 such that it is positioned vertically below the lowermost end of the inclined surface 122a when the seed deflector element 100a occupies the deflecting position, as shown in FIG. 7. Accordingly, a diverted seed 12 may roll or slide off of the inclined surface 122 (for example, under the pull of gravity) and into contact with the bottom wall 126 of the diverted seed receptacle 38. In the illustrated embodiment, an entirety of the diverted seed receptacle 38 is positioned entirely above the conveyor 22 and spaced apart from the conveyor 22 by a distance to provide clearance for the germination tray 14 to be conveyed in the conveying direction 50 beneath the diverted seed receptacle 38. In alternative embodiments, a portion or the entirety of the diverted seed receptacle 38 may be positioned below the conveyor 22. In such alternative embodiments, the inlet 124 of the diverted seed receptacle 38 may include a relatively narrow tube or other conduit that feeds the diverted seeds 12 laterally to the side of the conveyor 22, and then down into an enlarged portion of the diverted seed receptacle 38.

In some embodiments, the diverted seed receptacle 38 may feed the diverted seeds 12 back into the upstream seed storage container 32 and/or the downstream seed storage container 33. In such embodiments, one or more conveying mechanisms may be included for transporting the seeds from the diverted seed receptacle 38 to an inlet of the upstream seed storage container 32 and/or the downstream seed storage container 33.

With continued reference to FIGS. 5-7, the actuator 102a may be configured to move the seed deflector element 100a reciprocally between the non-deflecting position and the deflecting position. In some embodiments, the reciprocal motion provided by the actuator 102a may be linear and parallel to the conveying direction 50 of the conveyor 22. In present embodiment, the actuator 102a is configured as a pneumatic cylinder including a piston rod 130a connected at one end to the seed deflector element 100a. The piston rod 130 may extend through the housing 104a, and may be offset from the second portion 98 of the seed transport path 94 such the piston rod 130 does not deflect seeds 12 as they fall along second portion 98 of the seed transport path 94 when the seed deflector element 100a is arranged in the non-deflecting position, as shown in FIG. 6. The actuator 102a may receive pneumatic pressure from an external source such as a pneumatic pump and channel that pneumatic pressure to move the seed deflector element 100a back-and-forth between the deflecting and non-deflecting positions. In alternative embodiments, the actuator 102a may include a hydraulic cylinder powered by hydraulic pressure. In further alternative embodiments, the actuator 102a may be powered by an electric motor. In still further alternative embodiments, the actuator 102a may include a pressured air nozzle configured to generate a blast of air that pushes a seed 12 falling along the second portion 98 of the seed transport path 94 into the inlet 124 of the diverted seed receptacle 38.

As discussed in more detail below, the motion output by the actuator 102a may be controlled by the control unit 28 according to whether a seed 12 or a target number of seeds 12 has been determined to exist within the cell 54 of the germination tray 14 currently positioned at the terminal end of the seed transport path 94. Furthermore, each of the actuators 102a-t may be independently controllable by the control unit 28, such that the seed deflector elements 100a-t can be moved between respective deflecting and non-deflecting positions independently of each other.

While the seed diverting mechanism illustrated in FIGS. 1-7 is configured to selectively divert seeds 12 as they travel or fall along the second portion 98 of the seed transport path 94, alternative embodiments of the seed diverting mechanism can be configured differently. In some alternative embodiments, the seed diverting mechanism may be configured to selectively divert seeds 12 as they travel along the first portion 96 of the seed transport path 94. In such alternative embodiments the seed diverting mechanism may be configured to overcome or remove the suction force provided at the exterior of the rotatable drum 72 of the downstream seed sowing machine 27. In other alternative embodiments, the seed diverting mechanism may be configured to selectively divert seeds 12 prior to (e.g., immediately prior to) the seeds 12 being picked up by the rotatable drum 72 of the downstream seed sowing machine 27. In such alternative embodiments the seed diverting mechanism may be configured to remove the suction force provided at the exterior of the rotatable drum 72 of the downstream seed sowing machine 27, such that certain seeds 12 are not picked up by the rotatable drum 72.

Figure 8:
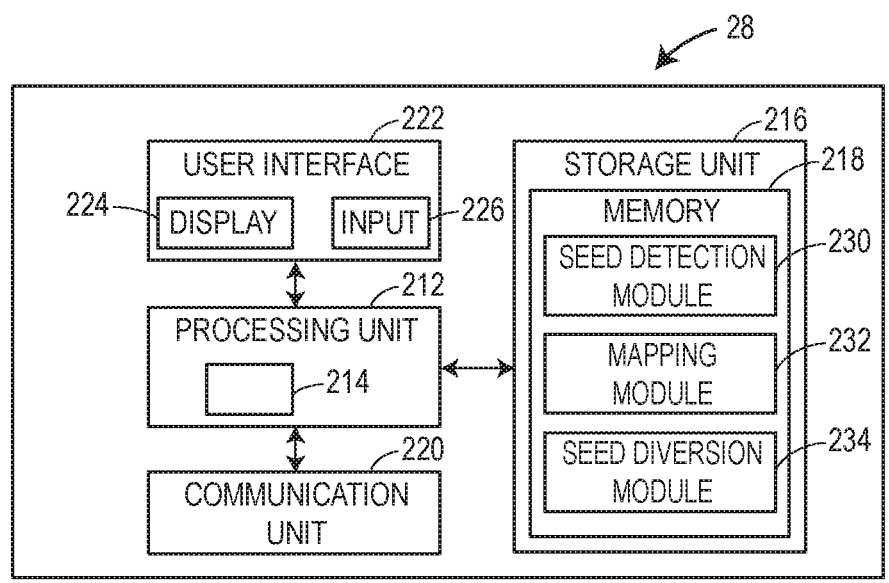
FIG. 8 is block diagram of an embodiment of a control unit constructed in accordance with principles of the present disclosure.

Turning to FIG. 8, the control unit 28 may take the form of a general purpose or special purpose computer, or any other suitable computing device. For example, the control unit 13 may be a programmable logic controller, a desktop computer, a laptop computer, a tablet computer, a smartphone, a server, or any combination thereof. Furthermore, the control unit 28 may be a standalone device or distributed across multiple devices. In some embodiments, the control unit 28 may include a processing unit 212 including one or more processors 214 (e.g., microprocessors), a storage unit 216 including one or more tangible, non-transitory computer-readable memories 218 (e.g., a RAM, a non-volatile memory such as a hard disk, a flash memory, a removable memory, a non-removable memory, etc.), a communication interface 220, a user interface 222 having a display 224 (e.g., a touchscreen, a computer monitor, a liquid crystal display, etc.) and an input unit 226 (e.g., a physical keyboard, touchscreen keyboard, button, etc.). The one or more memories 218 may include a non-transitory computer-readable storage medium configured to store data, including, for example, non-transitory computer-readable instructions constituting one or more services, applications, programs, or modules and any data operated on or produced by such services, applications, programs, or modules. The communication interface 220 may be configured to establish communication via a network and may include an antenna for wireless communications, a port for a wired connection, a connection to a modem, a connection to a router, or any combination thereof. In some embodiments, a touchscreen may form both the display 224 and the input unit 226. Also, in some embodiments, the components of the control unit 28 may communicate directly with each other via a system bus (not illustrated).

The processing unit 212 may be configured to fetch and execute instructions stored in the storage unit 216 to control the operation of, for example, the communication interface 220, the user interface 222, and/or other components of the control unit 28. The communication interface 220 may be configured to receive the seed signals from the detector 34 and/or other signals from other components of the seed sowing system 10 and, if necessary, perform an analog-to-digital conversion of such signals. Furthermore, the communication interface 220 may be configured to transmit signals to various components of the seed sowing system 10 to control their operation. For example, the communication interface 220 may be configured to transmit, via a wired or wireless connection, control signals to independently activate the actuators 102a-t to move respective ones of the seed deflector elements 100a-t between their non-deflecting and deflecting positions. Other components of the seed sowing system 10 that may receive control signals, via a wired or wireless connection, from the communication interface 220 may include the motor(s) responsible for rotating the rotatable drums 72 and 72*a*, the conveyor 22, the soil dispensing station 24, the detector 34, the seed suction element 80, and/or the seed release element 86.

In some embodiments, the memory 218 of the storage unit 216 may store a seed detection module 230, a mapping module 232, and a seed diversion module 234. The seed detection module 230 may be configured to process the seed signals received from the detector 34 to determine or identify, for each cell 54 of the germination tray 14, the presence or absence of a seed or a target number of seeds. For each cell 54 determined to be missing a seed or a target number of seeds, the seed detection module 230 may output an error signal or missing seed signal to the mapping module 230. For each cell 54 determined to be missing a seed or a target number of seeds, the seed detection module 230 may output a seed confirmation signal to the mapping module 230. In turn, the mapping module 230 may generate a map of failed and/or successful seed sowing locations within the germination tray 14 based on, at least, the error signals and/or seed confirmation signals received from the seed detection module 230. In some embodiments, the mapping module 230 may also take into account the dimensions of the germination tray 14 to create the map of failed and/or successful seed sowing locations.

The seed diversion module 234 may be configured to generate control signals for independently controlling the actuators 102*a-t* of the seed diversion mechanism 36 based on the map of failed and/or successful seed sowing locations generated by the mapping module 232. For each cell 54 of the germination tray 14 identified by the map or otherwise flagged to be missing a seed or a target number of seeds, the seed diversion module 234 may generate a non-deflecting control signal for controlling an appropriate one of the actuators 102*a-t* to move a corresponding one of the seed deflector elements 100*a-t* to its non-deflecting position when said cell 54 of the germination tray 14 passes through a respective seed transport path 94 during operation of the downstream seed sowing machine 27. For each cell 54 of the germination tray 14 identified by the map or otherwise flagged to include a seed or a target number of seeds, the seed diversion module 234 may generate a deflecting control signal for controlling an appropriate one of the actuators 102*a-t* to move a corresponding one of the seed deflector elements 100*a-t* to its deflecting position when said cell 54 of the germination tray 14 passes through a respective seed transport path 94 during operation of the downstream seeding sowing machine 27. Accordingly, the control unit 28 may be configured to automatically identify cells of a germination tray or other container(s) which include a seed or a target number of seeds, and thereafter control the seed diverting mechanism 36 to selectively divert seeds from at least one seed transport path defined by the downstream seed sowing machine 27 to prevent re-seeding of the cells of the germination tray or container(s) identified to include a seed or a target number of seeds.

While the foregoing embodiments of the seed sowing system are generally described as being stationary, assembly line type equipment, the scope of the present disclosure is not limited to such a configuration. Rather, alternative embodiments of the seed sowing system can be configured as or used in conjunction with a movable, trailer-like machine which is towed behind or carried by a tractor or other vehicle and which sows seeds in the ground as the machine travels over the ground.

A method of sowing seeds with the seed sowing system 10 or another similarly configured seed sowing system will now be described. Initially, an empty germination tray 14 may be placed on the conveyor 22, with the rows of cells 54 being arranged parallel to the conveying direction 50. Next, the germination tray 14 may be conveyed by the conveyor 22 beneath the soil dispensing station 24, such that the soil 64 is deposited into each of the cells 54 as the germination tray 14 moves continuously in the conveying direction 50. Subsequently, the conveyor 22 may convey the germination tray 14 beneath the upstream seed sowing machine 26. While the germination tray 14 moves continuously in the conveying direction 50, the upstream seed sowing machine 26 may drop or otherwise attempt to deposit a seed 12 or a target number of seeds 12 in each cell 54 of the germination tray 14. The manner in which the upstream seed sowing machine 26 deposits seeds in the germination tray 14 may be consistent with above-described operation of the rotatable drum 72*a*.

Next, the germination tray 14 may be conveyed by the conveyor 22 beneath the detector 34, such that each of the cells 54 passes through the through the field of view of the detector 34. As a result, the detector 34 may receive light or other detectable signals reflected and/or emitted by the seeds 12. The detector 34 may convert those detectable signals into seed signals indicative of the presence or absence of a seed or a target number of seeds in each cell 54 of the germination tray 14. The detector 34 may then output the seed signals to the control unit 28. In turn, the control unit 28 may process the seed signals, via, for example, the seed detection module 230, to identify or determine the cells 54 of the germination tray 14 including a seed or a target number of seeds. In some embodiments, the control unit 28 may generate a map, via, for example, the mapping module 230, of the failed and/or successful seed sowing locations within the germination tray 14 based on, at least, the processed seed signals.

While this detection process occurs, the germination tray 14 may be continuously conveyed by the conveyor 22 toward the downstream seed sowing machine 27. As the germination tray 14 approaches the downstream seed sowing machine 27, the rotatable drum 72 may pick up or otherwise receive seeds 12 or groupings of seeds 12 from the downstream seed storage container 33 at respective spaced apart receiving locations, in the manner described above. The rotatable drum 72 may then carry the spaced apart seeds 12 or groupings of seeds 12 along a first portion 96 of one or more of the seed transport paths 94 to respective spaced apart release locations, in the manner described above. Here, the spaced apart seeds 12 or groupings of seeds 12, which may be arranged in a linear row, may be dropped along the second portion 98 of one or more of the seed transport paths 94. The timing of the drop may be such that the seeds 12 or groupings of seeds 12 will be intended to fall into respective target cells 54 of the germination tray 14, which continues to be conveyed by the conveyor 22 in the conveying direction 50. During this fall, or immediately prior to this fall, the control unit 28, via, for example, the seed diversion module 234, may output control signals to independently control the actuators 102*a-t* to move each of the seed deflector elements 100*a-t* to either its non-deflecting position or deflecting position, depending on the target cells 54 of the germination 14 previously identified or determined to include or be missing a seed or a target number of seeds. For each cell 54 of the germination tray 14 identified or otherwise flagged to be missing a seed or a target number of seeds, an appropriate one of the seed deflector elements 100*a-t* may be moved to its non-deflecting position, such that a seed 12 or grouping of seeds 12 traveling along the second portion 98 of one of the seed transport paths 94 falls directly into a target cell 54. For each cell 54 of the germination tray 14 identified or otherwise flagged to include a seed or a target number of seeds, an appropriate one of the seed deflector elements 100a-t may be moved to its deflecting position, such that a seed 12 or grouping of seeds 12 traveling along the second portion 98 of one of the seed transport paths 94 is diverted into the diverted seed receptacle 38, in a manner as described above. This process of diverting certain seeds may be performed repeated for each of the cells 54 of the germination tray 14 while the germination tray 14 is conveyed continuously beneath the downstream seed sowing machine 27.

In alternative embodiments, the upstream seed sowing machine 26 may be omitted, and the downstream seed sowing machine 27 may be the only seed sowing machine employed by the seed sowing system 10. In such embodiments, an initial attempt may be made to sow each of the cells 54 of the germination tray 14 with a seed or a target number of seeds by the downstream seed sowing machine 27. Subsequently, the germination tray 14 may be removed from the conveyor 2 and then placed back on the conveyor 22 at a location upstream of the detector 34 and/or the downstream seed sowing machine 27. Next, the germination tray 14 may be conveyed beneath the detector 34 and/or the downstream seed sowing machine 27 for a second time, while performing the above-described steps of using the detector 34 to identify cells 54 of the germination tray 14 missing a seed or a target number of seeds and/or using the seed diverting mechanism 36 to prevent the downstream seed sowing machine 27 from re-seeding the cells 54 identified to include a seed or a target number of seeds. Accordingly, the downstream seed sowing machine 27 may be used for both an initial seed sowing attempt and a subsequent seed sowing correction procedure. Also, in such an alternative embodiment, the detector 34 may be located downstream (instead of upstream) of the downstream seed sowing machine 27, and may perform its detection functions after the germination tray 14 makes it first pass through the downstream seed sowing machine 27.

From the foregoing, it can be seen that the present disclosure advantageously provides seed sowing systems and methods which can automatically identify and correct seed sowing errors. Accordingly, a seed sowing machine which is used in conjunction with the presently disclosed seed sowing systems and methods may be operated at relatively high seed sowing speeds without necessarily compromising plant yields. Furthermore, the presently disclosed seed diverting mechanisms may be implemented in existing seed sowing machines with little or no modifications to an existing seed sowing machine. Other benefits and advantages will be apparent from a review of the present disclosure.

ADDITIONAL CONSIDERATIONS

While the present disclosure has been described in connection with various embodiments, it will be understood that the present disclosure is capable of further modifications. The present disclosure is intended to cover any variations, uses, or adaptations of the disclosed subject matter following, in general, the principles of the present disclosure, and including such departures from the present disclosure as, within the known and customary practice within the art to which the present disclosure pertains.

It is noted that the construction and arrangement of the seed sowing system and its various components and assemblies as shown in the various exemplary embodiments is illustrative only. Although only a few embodiments of the subject matter at issue have been described in detail in the present disclosure, those skilled in the art who review the present disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. For example, elements shown as integrally formed may be constructed of multiple parts or elements, and vice versa. Also, the position of elements may be reversed or otherwise varied, and the nature or number of discrete elements or positions may be altered or varied. Accordingly, all such modifications are intended to be included within the scope of the present disclosure as defined in the appended claims. Furthermore, the order or sequence of any process or method steps may be varied or re-sequenced according to alternative embodiments. Other substitutions, modifications, changes and omissions may be made in the design, operating conditions and arrangement of the various exemplary embodiments without departing from the scope of the present disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code implemented on a tangible, non-transitory machine-readable medium such as RAM, ROM, flash memory of a computer, hard disk drive, optical disk drive, tape drive, etc.) or hardware modules (e.g., an integrated circuit, an application-specific integrated circuit (ASIC), a field programmable logic array (FPLA)/field-programmable gate array (FPGA), etc.). A hardware module is a tangible unit capable of performing certain operations and may be configured or arranged in a certain manner. In exemplary implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a method for sowing seeds through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and system disclosed herein without departing from the spirit and scope defined in the appended claims.

Although the foregoing text sets forth a detailed description of numerous different implementations, it should be understood that the legal scope of the invention is defined by the words of the claims set forth at the end of this patent. The detailed description is to be construed as exemplary only and does not describe every possible implementation, as describing every possible implementation would be impractical, if not impossible. One could implement numerous alternate configurations, using either current technology or technology developed after the filing date of this patent, which would still fall within the scope of the claims.

What is claimed is:

1. A system for sowing seeds in cells of a germination tray, the system comprising:
   a conveyor configured to move the germination tray in a conveying direction;
   a seed storage container configured to hold a plurality of seeds;
   a seed sowing machine configured to receive the seeds from the seed storage container and drop the seeds along at least one seed transport path into respective cells of the germination tray as the conveyor moves the germination tray in the conveying direction beneath at least a portion of the seed sowing machine; and
   a seed diverting mechanism positioned vertically between the conveyor and the at least a portion of the seed sowing machine, the seed diverting mechanism being configured to selectively divert seeds falling under gravity from the at least one seed transport path such that the diverted seeds are not deposited in cells of the germination tray during operation.

2. The system of claim 1, comprising a detector configured to output seed signals indicative of the presence or absence of a seed or a target number of seeds in each cell of the germination tray.

3. The system of claim 2, comprising a control unit configured to
   process the seed signals to identify the cells of the germination tray including a seed or a target number of seeds, and
   control the seed diverting mechanism to selectively divert seeds from the at least one seed transport path to prevent re-seeding of the cells of the germination tray identified to include a seed or a target number of seeds.

4. The system of claim 3, comprising a primary seed sowing machine arranged upstream of the seed sowing machine in the conveying direction, the primary seed sowing machine being configured to transfer seeds from the seed storage container or another seed storage container into respective cells of the germination tray as the conveyor moves the germination tray in the conveying direction.

5. The system of claim 1, the seed diverting mechanism including a seed deflector element movable between a non-deflecting position where the seed deflector element is spaced apart from the at least one seed transport path, and a deflecting position where the seed deflector element obstructs at least a portion of the at least one seed transport path.

6. The system of claim 5, the seed deflector element having an inclined surface, the inclined surface intersecting at least a portion of the at least one seed transport path at a non-perpendicular angle when the seed deflector element occupies the deflecting position.

7. The system of claim 5, comprising an actuator configured to move the seed deflector element between the non-deflecting position and the deflecting position.

8. The system of claim 5, comprising a diverted seed receptacle positioned to receive seeds diverted by the seed deflector element when the seed deflector element occupies the deflecting position.

9. The system of claim 1, the seed sowing machine including a drum rotatable about a rotational axis and having an outer surface configured to carry seeds received from the seed storage container along a first portion of the at least one seed transport path as the drum rotates about the rotational axis.

10. The system of claim 9, the seed sowing machine including
    a plurality of rows of openings formed in the outer surface of the drum and communicating with a hollow interior of the drum, and
    a seed suction element configured to reduce pressure within the hollow interior of the drum such that at least some of the seeds are temporarily held against the outer surface of the drum at locations corresponding to at least some of the openings included in the plurality of rows of openings.

11. The system of claim 10, the seed sowing machine including a seed release element configured to create a pressure differential within the hollow interior of the drum causing at least one seed held against the outer surface of the drum to be released, wherein the at least one seed when released falls in a vertical direction along a second portion of the at least one seed transport path.

12. The system of claim 1, each of the seeds being coated with, infused with, or surrounded by one or more of: a fluorescent dye, a colored dye, a biochemical dye, a magnetic material, and an isotopic material.

13. A seed diverting mechanism configured for use with a seed sowing machine for dropping seeds along at least one seed transport path into respective cells of a germination tray being moved relative to the seed diverting mechanism by a conveyor, the seed diverting mechanism comprising:
    a seed deflector element configured to be positioned vertically between the seed sowing machine and the conveyor, the seed deflector being movable between a non-deflecting position where the seed deflector element is spaced apart from the at least one seed transport path, and a deflecting position where the seed deflector element obstructs at least a portion of the at least one seed transport path and diverts seeds falling under gravity from the at least one seed transport path such that the diverted seeds are not deposited in cells of the germination tray; and an actuator configured to move the seed deflector element between the non-deflecting position and the deflecting position.

14. The seed diverting mechanism of claim 13, the seed deflector element having an inclined surface, the inclined surface intersecting the at least one seed transport path at a non-perpendicular angle when the seed deflector element occupies the deflecting position.

15. The seed diverting mechanism of claim 14, comprising a diverted seed receptacle positioned to receive seeds diverted by the seed deflector element when the seed deflector element occupies the deflecting position.

16. The seed diverting mechanism of claim 15, the diverted seed receptacle having an inlet positioned to receive the diverted seeds directly from the inclined surface of the seed deflector element.

17. The seed diverting mechanism of claim 13, the actuator being configured to move the seed deflector element reciprocally along a linear direction.

18. The seed diverting mechanism of claim 13, comprising a control unit configured to process seed signals received from a detector to identify the cells of the germination tray including a seed or a target number of seeds, control the actuator to move the seed deflector element to the deflecting position when a cell identified to include a seed or a target number of seeds intersects the at least one seed transport path, and control the actuator to move the seed deflector element to the non-deflecting position when a cell identified to be missing a seed or a target number of seeds intersects the at least one seed transport path.

19. A seed sowing method comprising:

identifying cells of a germination tray including a seed or a target number of seeds based on signals received from a detector;

receiving, with a seed sowing machine, seeds or groupings of seeds from a seed storage container at respective receiving locations;

carrying, with the seed sowing machine, the seeds or groupings of seeds to respective release locations arranged above the germination tray;

releasing the seeds or groupings of seeds from the seed sowing machine at the respective release locations such that each of the seeds or groupings of seeds falls under gravity along a respective seed transport path and into a cell of the germination tray; and diverting at least one of the seeds or groupings of seeds falling under gravity along the respective seed transport path to prevent the seed sowing machine from depositing the at least one of the seeds or groupings of seeds into a cell of the germination tray previously identified to include a seed or a target number of seeds.

20. The seed sowing method of claim 19, comprising, prior to identifying cells of the germination tray including a seed or a target number of seeds based on signals received from a detector, attempting to add a seed or a target number of seeds to each cell of the germination tray.

21. The seed sowing method of claim 19, comprising receiving the deflected at least one of the seeds or groupings of seeds in a diverted seed receptacle.

22. The seed sowing method of claim 19, comprising conveying the germination tray relative to the seed sowing machine while simultaneously diverting the at least one of the seeds or groupings of seeds to prevent the seed sowing machine from depositing the at least one of the seeds or groupings of seeds into the cell of the germination tray previously identified to include a seed or a target number of seeds.

* * * * *